Nov. 10, 1931.  A. SUNDH  1,830,920
SELF HOLDING DEVICE FOR NUTS
Filed July 13, 1928
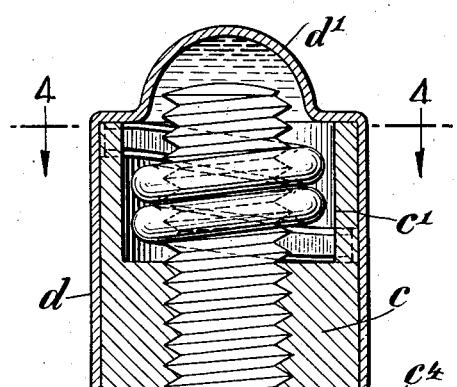
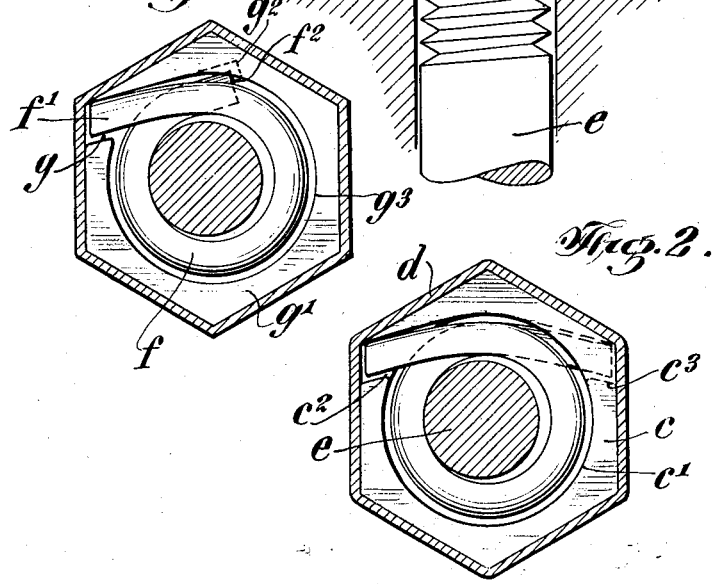
INVENTOR.
August Sundh,
BY his
ATTORNEYS.

Patented Nov. 10, 1931

1,830,920

UNITED STATES PATENT OFFICE

AUGUST SUNDH, OF HASTINGS UPON HUDSON, NEW YORK

SELF-HOLDING DEVICE FOR NUTS

Application filed July 13, 1928. Serial No. 292,441.

In applications Serial No. 262,381, filed March 17, 1928, and Serial No. 292,440, filed July 13, 1928, by the present applicant there is disclosed and claimed a self-holding nut functioning in accordance with a novel principle characterized by the provision of a holding spring which has its holding force increased momentarily when the nut tends to be displaced on the bolt but yet prevents a further increase in said holding force when a predetermined maximum force is applied to the nut to turn it off the bolt. The present invention relates to self-holding devices embodying the same principle but in which the embodiment is somewhat different to meet certain conditions. Generally speaking, the present invention is concerned with the association of the improved holding devices with a nut which is manufactured with a cavity of circular form to receive the holding spring. Such a cavity is often more inexpensive to provide particularly in small nuts but special provision must be made for associating the improved spring with the nut in such manner that it will function in accordance with the principle referred to. In other words, means must be provided for proper co-operation between the nut and the spring under the various conditions encountered. More particularly, the invention has for its principal object to provide in the wall of a nut an opening of such form and dimensions and so related to the holding spring as to anchor one end thereof to the nut with capacity for limiting relative movement of predetermined extent, therebetween. The opening contemplated can best be made by drilling in through the outer wall of the nut and tangentially to the circular cavity which receives the spring so that when the spring is introduced in the cavity one free yielding end thereof will extend tangentially into said opening. The improvements are suitable for use where a coiled spring of several turns is employed as suggested in application Serial No. 262,381 as well as an embodiment wherein springs of single turns are used. Further, in the improved construction provision may be made for closing the outer end of the hole through the nut by means of a water-tight casing in which lubricant may be retained for the reasons set forth and claimed in application Serial No. 292,440.

A further object of the invention is to provide an anchorage of the character described for the yielding end of such a holding spring which shall not only permit relative rotational movement to a limited degree between the nut and such end but shall also permit the end to slide relatively to the nut. By permitting the end to extend into the wall of the cavity in the manner contemplated it follows that contact between the nut and such end is at a point relatively remote from the tangential point of contact of the spring with the bolt so that a relatively long leverage is provided which facilitates wrapping of the end partially around the bolt when the nut is turned.

A further general object of the invention is to preserve in the improved embodiment all of the characteristics and advantages of the several types of self-holding nut disclosed in the said two co-pending applications. Reference is now to be had to the accompanying drawings for a detailed description of the additional embodiments in which drawings:

Figure 1 is a view in section showing a nut provided with peripheral openings to anchor the free ends of a holding spring and having a water-tight enclosure and lubricant retainer applied to the exterior of the nut.

Figure 2 is a sectional view through the parts shown in Figure 1 taken on the plane indicated by the line 4—4 of Figure 1 and looking in the direction of the arrows.

Figure 3 is a sectional view showing a modified construction.

In the said co-pending applications the nut is provided with a recess at one end to receive the holding spring. In each instance the recess is of irregular outline in cross section thereby presenting interior walls which may engage one or both ends of the holding spring to cause the spring to function in its intended manner when the nut is moved. The expense of providing a cavity of irregular cross section may be greater in some instances than in providing a cavity of circular form.

When a cavity of circular form is present, however, the spring end has no bearing point whereby co-operation between the nut and spring is insured. In the present invention every form of nut is illustrated as a circular cavity. The principal object of the invention is to provide the nut with a suitable anchorage for the spring end or ends whereby it is caused to increase its holding force or to have its holding force positively relieved as the case may be.

Figures 1 and 2 show a nut $c$ which is formed with a relatively deep circular cavity $c'$ to receive a coiled spring having several turns and of the general type illustrated in application Serial No. 262,381. The wall of the nut is drilled through to provide openings $c^2$, $c^3$, to receive the ends of the spring. The openings $c^2$ and $c^3$ are generally tangential, respectively, to the wall of the cavity to receive the ends of the spring. After the parts are assembled an enclosure $d$ may be pressed onto the nut to close the openings $c^2$, $c^3$, and provide an end cap $d'$ within which lubricant may be retained. The form of this cap may preferably be such as to overlie the upper end turn of the spring thereby resisting longitudinal movement thereof as suggested in application Serial No. 292,440. The inner end of the nut $c$ may have its edge chamfered as indicated at $c^4$ and the enclosure $d$ may extend over this chamfer so as to present a free and relatively soft edge which may be forced into intimate engagement with any abutting surface when the nut is turned down fully on the bolt $e$ and formed with such surface a water-tight joint thereby excluding moisture from the parts at the inner end of the nut.

In Figure 3 there is shown a spring $f$ comprising essentially a single turn but having one end overlying the other end. The extended free end $f'$ of the spring enters an opening $g$ in the wall of the nut $g'$ in the manner heretofore described while the other end $f^2$ of the spring may co-operate with a shouldered seat $g^2$ formed in the wall of the cavity $g^3$, this seat conforming in size and configuration to the butt end $f^2$ and serving as a stop therefor to cause the spring to function in the intended manner when the nut is rotated in one direction, as will be understood.

In all of the springs referred to it will be understood that their surfaces may be of any desired hardness depending on the conditions of use as was made clear in the other two co-pending applications.

Changes in details of design, construction and interrelation may be made without departing from the invention so long as the principles set forth are utilized.

What I claim is:

1. A threaded nut having a cavity in its upper end, a threaded bolt for said nut, a holding device comprising a helically wound spring with tangential ends, the cavity being formed with openings in its wall to receive the ends, and means to cover the openings for the spring ends, said covering means forming an abutment for the spring ends.

2. A threaded nut having a cavity, a threaded bolt for said nut, a holding device comprising a coiled spring with tangentially extending ends, said cavity being formed with openings in its wall to receive the ends of said extending ends, a protective fluid-tight hood rigidly applied over the nut, and walls of the cavity, closing up the openings for the spring ends and forming abutments for the spring ends.

3. A threaded nut having a cavity, a threaded bolt for said nut, a helical spring holding device with tangentially extending ends, the cavity having at its lower end a hole in the wall and an opening slotted from the top in the upper end of the wall for contracting said end when the nut is turned on the bolt, means to cover up said openings in the wall of the cavity to provide abutments for the spring ends and free spaces provided between said covering and each of the ends when the nut is threaded and held from displacement on the bolt.

4. A threaded nut having a cavity, a threaded bolt for said nut, a holding device comprising a coiled spring with tangentially extending ends, the cavity having openings in its wall forming a driving engagement for said ends to cause the spring to rotate in unison with the nut in either direction, one of said ends being adapted to yield and slide in the opening, when the nut is turned in one direction, the other end being relatively fixed, and a covering for the opening against which the end abuts when the nut has been turned on the bolt a predetermined degree.

This specification signed this 12th day of July A. D. 1928.

AUGUST SUNDH.